US012606068B2

(12) United States Patent
Nuss

(10) Patent No.: US 12,606,068 B2
(45) Date of Patent: Apr. 21, 2026

(54) BEARING DEVICE, GUIDE ARRANGEMENT AND EQUIPMENT PART OF A VEHICLE INTERIOR

(71) Applicant: GRAMMER AG, Ursensollen (DE)

(72) Inventor: Ralph Nuss, Poppenricht (DE)

(73) Assignee: GRAMMER AG, Ursensollen (DE)

( * ) Notice: Subject to any disclaimer, the term of this patent is extended or adjusted under 35 U.S.C. 154(b) by 187 days.

(21) Appl. No.: 18/678,163

(22) Filed: May 30, 2024

(65) Prior Publication Data

US 2025/0067305 A1 Feb. 27, 2025

(30) Foreign Application Priority Data

Jun. 14, 2023 (DE) ..................... 10 2023 115 519.9

(51) Int. Cl.
*A61G 15/00* (2006.01)
*B60N 2/815* (2018.01)
(52) U.S. Cl.
CPC .......... *B60N 2/815* (2018.02); *F16C 2326/01* (2013.01)
(58) Field of Classification Search
CPC ........ B60N 2/818; B60N 2/809; B60N 2/815; B60N 2/897; B60N 2/888; B60N 2/2851; B60N 2/68
See application file for complete search history.

(56) References Cited

U.S. PATENT DOCUMENTS

| | | | | |
|---|---|---|---|---|
| 5,713,636 A * | 2/1998 | De Filippo | ............ | B60N 2/815 |
| | | | | 297/391 |
| 6,364,415 B1 * | 4/2002 | Mori | ...................... | B60N 2/818 |
| | | | | 297/410 |
| 8,998,336 B2 * | 4/2015 | Stein | ...................... | B60N 2/809 |
| | | | | 297/410 |
| 9,994,133 B2 | 6/2018 | Boesl | | |
| 2015/0258924 A1 * | 9/2015 | Ishihara | ................. | B60N 2/865 |
| | | | | 297/216.12 |
| 2016/0052430 A1 * | 2/2016 | Abe | ......................... | B60N 2/80 |
| | | | | 297/410 |
| 2018/0134197 A1 * | 5/2018 | Kober | ..................... | B60N 2/897 |
| 2018/0222366 A1 * | 8/2018 | Okubo | ..................... | B60N 2/80 |
| 2018/0319303 A1 * | 11/2018 | Jeong | ..................... | B60N 2/844 |
| 2019/0061583 A1 * | 2/2019 | Mu | ......................... | B60N 2/818 |
| 2020/0070700 A1 * | 3/2020 | Jeong | ..................... | B60N 2/856 |
| 2020/0215947 A1 * | 7/2020 | Jeong | ..................... | B60N 2/938 |
| 2020/0282890 A1 * | 9/2020 | Jeong | ..................... | B60N 2/888 |
| 2024/0424967 A1 * | 12/2024 | Hong | ..................... | B60N 2/815 |
| 2025/0067305 A1 * | 2/2025 | Nuss | ..................... | B60N 2/818 |

FOREIGN PATENT DOCUMENTS

| | | |
|---|---|---|
| DE | 102015000108 A1 | 7/2016 |
| DE | 102021125747 A1 | 4/2023 |

* cited by examiner

*Primary Examiner* — Shin H Kim
(74) *Attorney, Agent, or Firm* — LUCAS & MERCANTI, LLP; Klaus P. Stoffel

(57) ABSTRACT

A bearing unit having a receiving region with an opening in which a rod can be arranged so as to be relatively movable, including at least one first bearing structure and a second bearing structure, which are configured to be in contact with the rod when the rod is located in the receiving region.

14 Claims, 10 Drawing Sheets

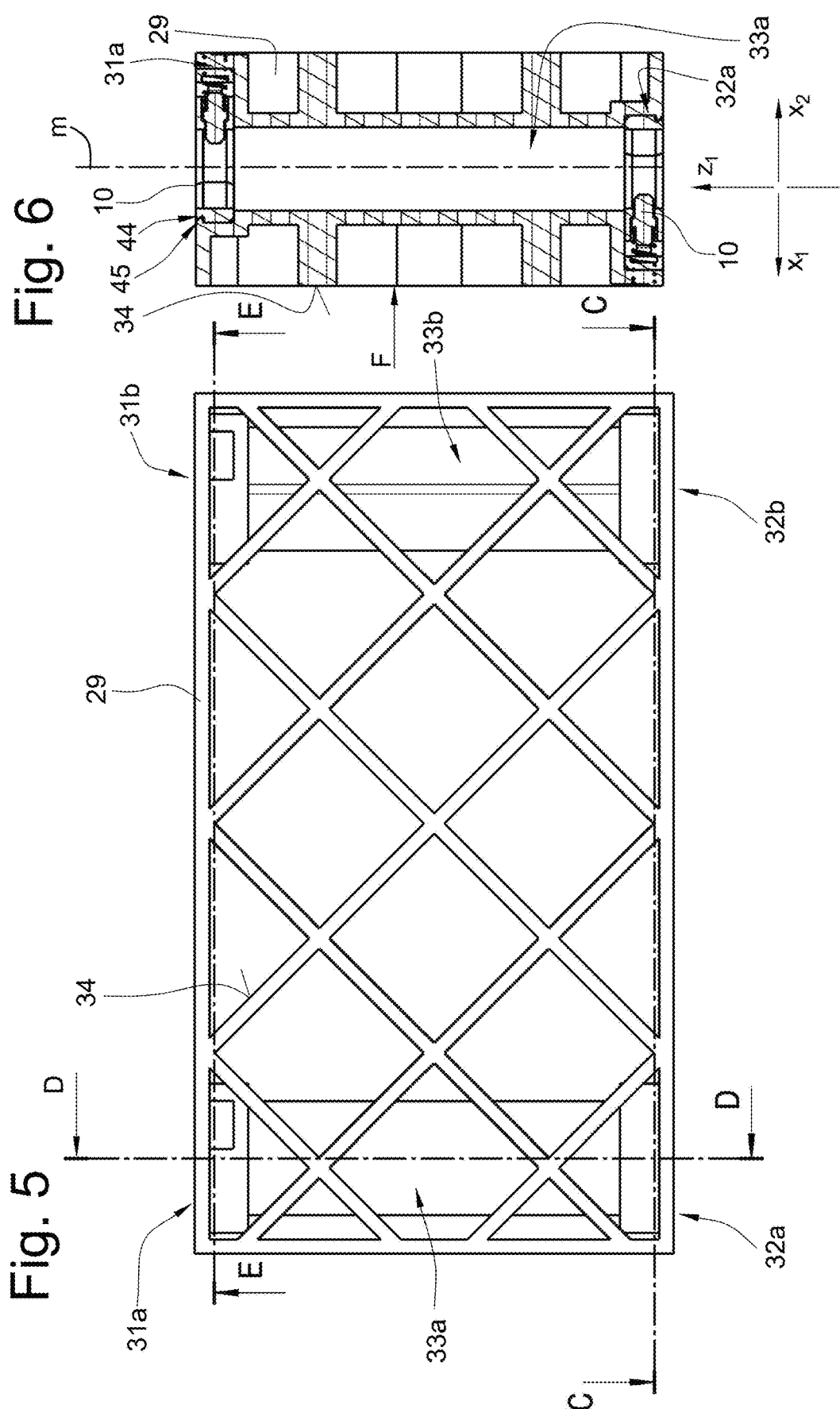

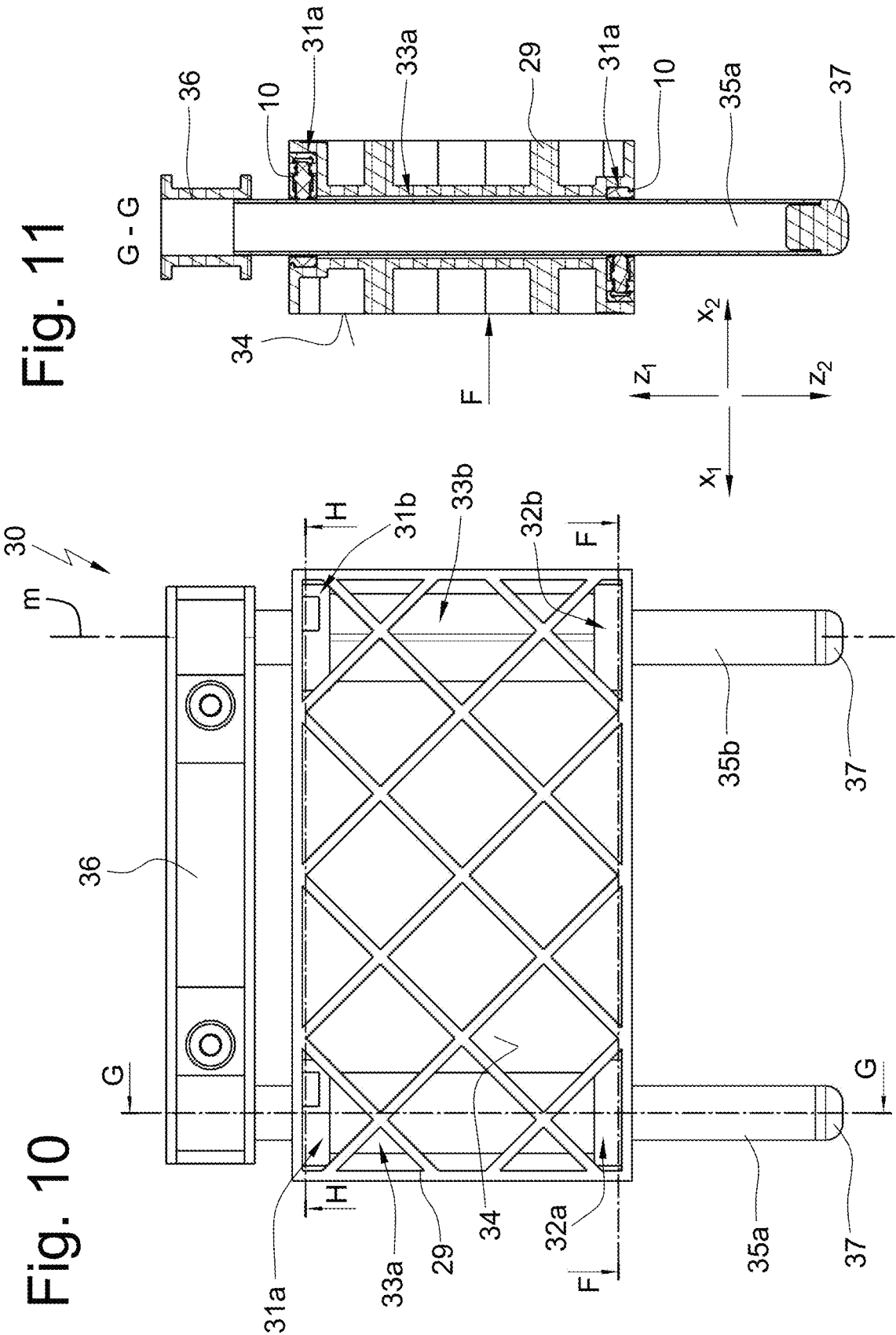

BEARING DEVICE, GUIDE ARRANGEMENT AND EQUIPMENT PART OF A VEHICLE INTERIOR

CROSS-REFERENCE TO RELATED APPLICATIONS

The present application claims priority of DE 10 2023 115 519.9, filed Jun. 14, 2023, the priority of this application is hereby claimed and this application is incorporated herein by reference.

BACKGROUND OF THE INVENTION

The invention relates firstly to a bearing unit, comprising at least one bearing structure.

Such a bearing unit is known from vehicle seat head restraints, for example. A base part of the head restraint is provided with two retaining rods, which are received in a guide of the back rest. The guide comprises bearing units with bearing structures that are in contact with the rod.

SUMMARY OF THE INVENTION

According to a first aspect, an object of the invention was to provide a bearing unit on which a base part of a vehicle equipment part can be guided movably or immovably on a rod without play. In addition, an object of the invention was to provide a bearing unit which can be mounted without play in a bearing seat of the base part. Moreover, an object of the invention was to provide a bearing unit which cannot inadvertently come loose from the bearing seat of the base part. An object was also to provide a bearing unit which can be mounted in a modular manner as an assembly.

The bearing unit is provided with a receiving region in which a rod can be arranged so as to be relatively movable or immovable. The feature "immovable" means in this context that the bearing unit does not move relative to the rod in the direction of the longitudinal axis of the rod.

The cross-section of the rod can be any conceivable shape, e.g. round, oval or polygonal.

The bearing unit comprises at least one first bearing structure and a second bearing structure, wherein each bearing structure is designed to be in contact with the rod when the rod is in the receiving region. The bearing unit comprises at least one first bearing part having the first bearing structure and a primary contact surface for cooperating with a first mating surface of a bearing seat, and a second bearing part having the second bearing structure.

At least one region of the second bearing part is loaded in a first direction by a loading device such that the rod can be loaded by the second bearing structure against the first bearing structure. In this way, a zero-play support in relation to a rod received in the receiving region can be achieved.

The bearing unit comprises a third bearing part having a secondary contact surface for cooperating with a second mating surface of the bearing seat, which third bearing part is arranged so as to be movable relative to the first bearing part. The loading device or a dedicated loading device loads the third bearing part in a second direction, which is opposite the first direction. In other words, the first bearing part and the third bearing part are forced apart in such a way that both bearing parts bear against a wall of the bearing seat.

With the bearing unit according to the invention, it is thus possible to guide a base part of a vehicle equipment part movably or immovably and without play on at least one rod. In addition, the bearing unit can be mounted without play in a bearing seat so that no distracting noise occurs. The bearing unit can be configured in such a way that it cannot inadvertently come loose from the bearing seat. A secure support is thus also possible with the bearing unit. The bearing unit can be configured in a modular manner as an assembly, thus ensuring it is convenient to manipulate during installation.

The bearing unit is configured in a modular manner as an assembly, for example, and forms a frame, for example, which has bearing means for receiving the bearing unit in a bearing seat. The frame comprises the receiving region and the bearing structures. The frame is formed by the first and the third bearing part, for example. The frame can have any suitable external form. It is rectangular, for example. The frame forms the primary contact surface and the secondary contact surface, for example.

At least one of the bearing structures is configured as a point-type bearing, for example, i.e. the contact area with the rod is small. For example, all bearing structures are configured in such a way that they have minimal contact with the rod. In the case of a round rod cooperating with linear bearing structures, a point-type bearing is achieved automatically. If the rod is angular rather than round and has flat faces between the corners, the bearing structures are formed by convex surfaces, for example, such that a point-type bearing is again achieved.

The third bearing part and the first bearing part are guided so as to be movable on one another, for example. The first bearing part and the third bearing part form the frame, for example. If the third bearing part is movably guided on the first bearing part, a module is formed, for example, which can be inserted into the bearing seat as an assembly. If the first bearing part is movably guided on the third bearing part, the bearing dimensions can be varied in one dimension and the length of the bearing unit can be changed—in order to mount it in or remove it from the bearing seat, for example. The change in length, e.g. a shortening, can take place against spring force. After the change in length, the restoring force of the spring means causes the first bearing part and the third bearing part to bear against surfaces of the bearing seat.

The third bearing part has a stopper surface, for example, which cooperates with an abutment surface of the first bearing part in order to limit the relative movement of the first bearing part and the third bearing part. The movement of the third bearing part is limited in the removal direction, for example. In a movement direction which is opposite to the removal direction, the movement is also limited by cooperating stop surfaces of the first bearing part and the third bearing part, for example. In this way, the first bearing part and the third bearing part cannot inadvertently come loose from each other.

The stopper surface of the third bearing part is loaded against the abutment surface of the first bearing part by the loading device or by a separate loading device, for example. This means that the third bearing part can be loaded by a separate loading device, for example, or alternatively by the same loading device that loads the second part. The abutment surface of the first bearing part is configured so that the bearing unit, when not mounted in the bearing seat, forms an assembly and the parts do not come apart. The main purpose of loading the third bearing part is to hold the third bearing part without play against the second mating surface of a bearing seat. In this way, for example, the first bearing part and the third bearing part can be pushed apart so that the two bearing parts bear without play against the first mating surface or second mating surface, respectively, of the bearing seat.

The second bearing part is movably guided in a guide of the first bearing part, for example. The second bearing part comprises at least one bearing structure which is configured to be in contact with the rod. The second bearing part is loaded directly or indirectly by a loading device, particularly by a spring, for example, such that it presses the rod against the at least one first bearing structure of the first bearing part. Since the second bearing part is movably arranged in the bearing seat, it can compensate tolerances. The second bearing part is guided in a linearly movable manner on the first bearing part, for example.

The second bearing part comprises a stop surface, for example, which cooperates with a stop edge of the first bearing part to limit the movement of the second bearing part. The stop surface is loaded against the stop edge of the first bearing part by the loading device, for example. In this case too, the stop serves to fix a relative position of the second bearing part in relation to the first bearing part if the bearing unit is not mounted in a bearing seat. The loading device is intended to load the second bearing part against the rod and the rod against the first bearing part so as to ensure zero play between the first bearing part, rod and second bearing part.

The loading device comprises at least one spring, for example. A spring is a simple and inexpensive means of applying the load. Other suitable loading devices can also be used.

The bearing unit extends substantially in a first spatial direction and a second spatial direction and has a limited extent in respect of a third spatial direction. The bearing unit is configured as a thin plate, for example. It then requires little space in the bearing seat.

The bearing unit is configured in such a way that a central rod axis of a rod located in the opening in a region of the rod support extends in the third spatial direction of the bearing unit. Thus, while the bearing unit extends substantially in a first and second spatial direction, the rod passing through the receiving region extends in the third spatial direction.

The second bearing part is configured in such a way that, for example, it is located in the movement path of the third bearing part when there is a rod in the receiving region, such that there can be little or no variation in the dimensions of the bearing unit. In this way, with a corresponding configuration of the bearing seat, there is no possibility of an inadvertent removal from the bearing seat when a rod is mounted in the receiving region. In other words, the movability of the third bearing part in relation to the first bearing part, for example, is not sufficient to overcome an undercut or protrusion of the bearing seat, for example.

According to a second aspect of the invention, the invention relates to a guiding arrangement for guiding a rod.

Reference is made to the prior art mentioned in regard to the first aspect of the invention.

According to a second aspect, an object of the invention was to provide a guiding arrangement on which a base part of a vehicle equipment part can be guided movably or immovably on a rod without play. In addition, an object of the invention was to provide a guiding arrangement which can be mounted without play in a bearing seat of the base part. Moreover, an object of the invention was to provide a guiding arrangement which cannot accidentally come loose from the bearing seat of the base part.

The guiding arrangement for an equipment part comprises at least one bearing unit according to the first aspect of the invention, which can be mounted in a bearing seat of the base part. The equipment part is a head restraint or an armrest, for example. The bearing unit is guided on a rod. At least two bearing units are guided on a rod, for example. The rod can be formed by a free end of a stirrup or by a single rod. The rod is configured as a profiled element, for example.

For embodiments and advantages, in the interest of avoiding repetition, reference is made to the statements regarding the first aspect of the invention.

According to a third aspect, the invention relates to an equipment part of the vehicle interior.

Such an equipment part is a head restraint or an armrest, for example. It comprises a base part, which is immovably or movably mounted on at least one rod.

An object of the invention was to provide an equipment part having a bearing arrangement with which a base part can be mounted without play. In addition, an object of the invention was to provide an equipment part wherein the bearing of the bearing arrangement is received without play in a bearing seat of the base part. It was also an object of the invention to provide an equipment part having a bearing arrangement wherein a bearing cannot accidentally come loose from the bearing seat. A further object was to provide a bearing which can be mounted and/or removed in a modular manner as an assembly.

The equipment part comprises a base part which is mounted with a guiding arrangement according to the second aspect of the invention. The base part is movably or immovably mounted on at least one rod portion of a rod. The base part comprises at least one bearing seat in which a bearing unit according to the first aspect of the invention is mounted. The rod passes through an opening in a receiving region of the bearing unit.

Regarding the embodiments and advantages, reference is made to the first and second aspect of the invention, the disclosure of which is included in full in the third aspect.

At least one bearing seat has first retaining means, for example, in the form of e.g. an undercut, such that the bearing unit can only be mounted in and removed from the bearing seat by changing the dimensions, e.g. changing the length, against the force of the loading device (e.g. at least one spring). The change of length takes place by moving two bearing parts in relation to each other, for example. The relative movement takes place against the restoring force of the loading device, for example. In other words, a smaller installation clearance in the bearing seat has to be overcome, wherein one dimension of the bearing unit is shortened. Once the bearing unit is located in the bearing seat, it can extend to a greater length in this dimension again and bear against the wall of the bearing seat.

The guide comprises, for example, at least two bearing seats, wherein a first bearing unit in a first bearing seat is arranged rotated through 180° about a center point in relation to a second bearing unit in a second bearing seat. Depending on a loading situation of the equipment part, the fixed bearing structures can then be held on the rod by a user in such a way that no movement of the equipment part due to the resilience of the spring occurs under actual loading.

Exemplary embodiments of the invention are described by way of example in the following description of the figures, making reference also to the drawings. For the sake of clarity, including where different exemplary embodiments are concerned, the same or comparable parts or elements or regions are identified by the same reference signs, in some cases with the addition of lower-case letters.

Within the scope of the invention, features that are described only in relation to one exemplary embodiment can also be provided in any other exemplary embodiment of the invention. Exemplary embodiments that are modified in such a way, even if they are not shown in the drawings, are encompassed by the invention.

All disclosed features are essential to the invention in their own right. The disclosed content of the cited publications and of the described prior art devices is hereby included in its entirety in the disclosure of the application, including for the purpose of incorporating individual or multiple features of these documents in one or more claims of the present application.

BRIEF DESCRIPTION OF THE DRAWING

In the drawings:

FIG. 5 shows a base part of an equipment part, in the present case a head restraint, with two guides, each for one rod, FIG. 6 shows a cross-sectional view along section line D-D in FIG. 5, FIG. 10 shows a front view of the equipment part according to FIG. 9, FIG. 11 shows a cross-sectional view along section line G-G in FIG. 10.

DETAILED DESCRIPTION OF THE INVENTION

Figure 2:
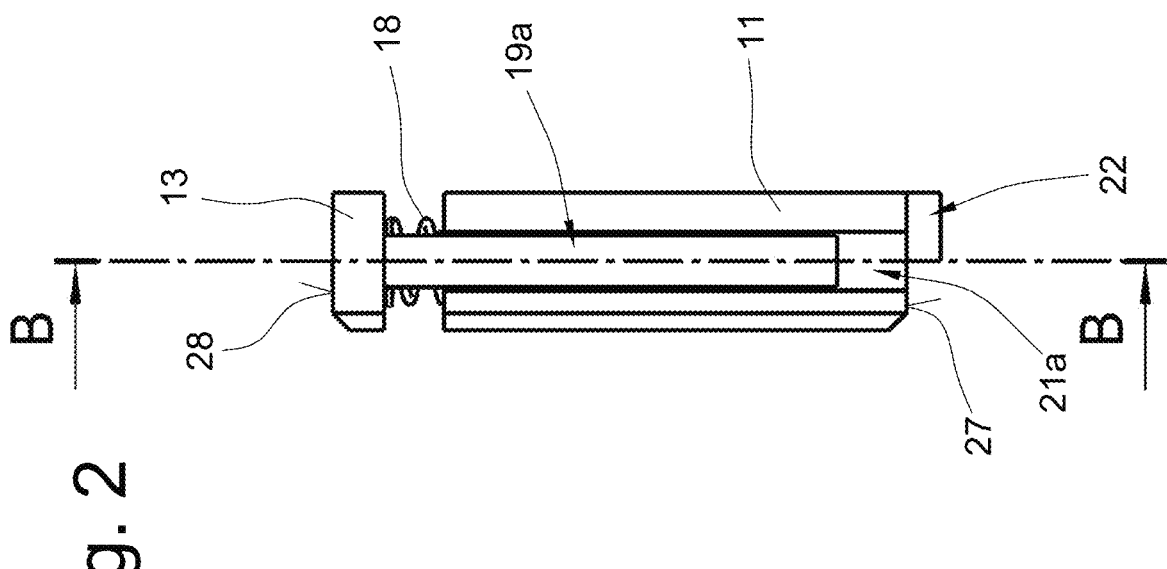
FIG. 2 shows a view of the bearing unit according to view arrow G in FIG. 1.

The bearing unit as a whole is denoted by reference sign 10 in the drawings.

Figure 1:
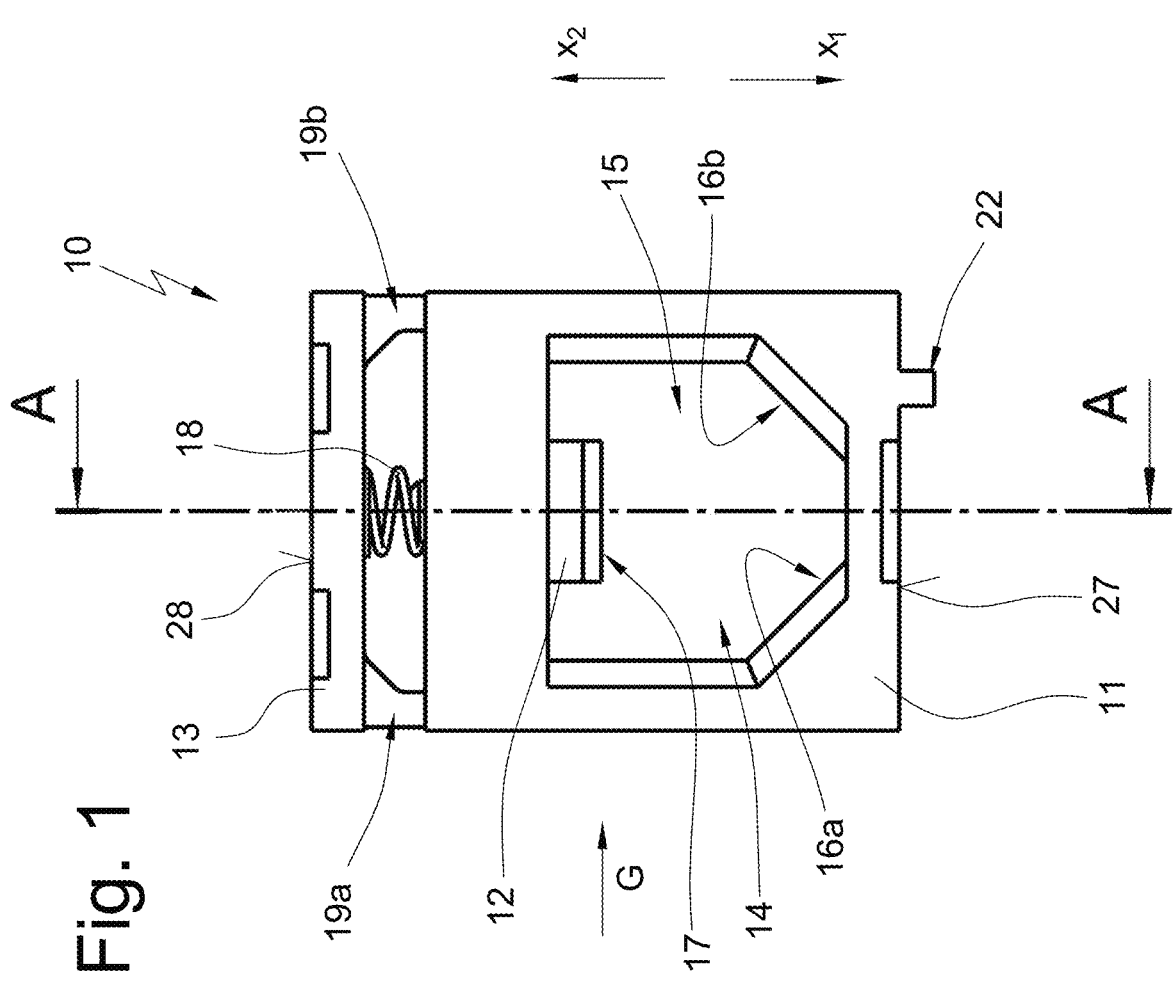
FIG. 1 shows a plan view onto a bearing unit.

According to FIG. 1, the bearing unit 10 comprises a first bearing part 11, a second bearing part 12 and a third bearing part 13. The first bearing part 11 forms a receiving region 14. The receiving region comprises an opening 15, which in the present example is formed by the first bearing part 11 but which alternatively can also be formed by at least two bearing parts. In addition, the first bearing part 11 comprises bearing structures 16a and 16b. The second bearing part 12 is guided movably on the first bearing part 11 in the directions x1 and x2 in relation to the first bearing part 11, by means of a guide 43. It is provided with a bearing structure 17.

The third bearing part 13 comprises two arms 19a and 19b which, as shown in FIG. 2, are movably guided in the directions x1 and x2 in grooves 21a and 21b in the first bearing part 11. A form-fitting element 22 on the first bearing part 11 ensures that the bearing unit 10 is correctly mounted in a bearing seat and engages in a form-fitting manner into an opening in the bearing seat when it is positioned therein.

Figures 3, 4:
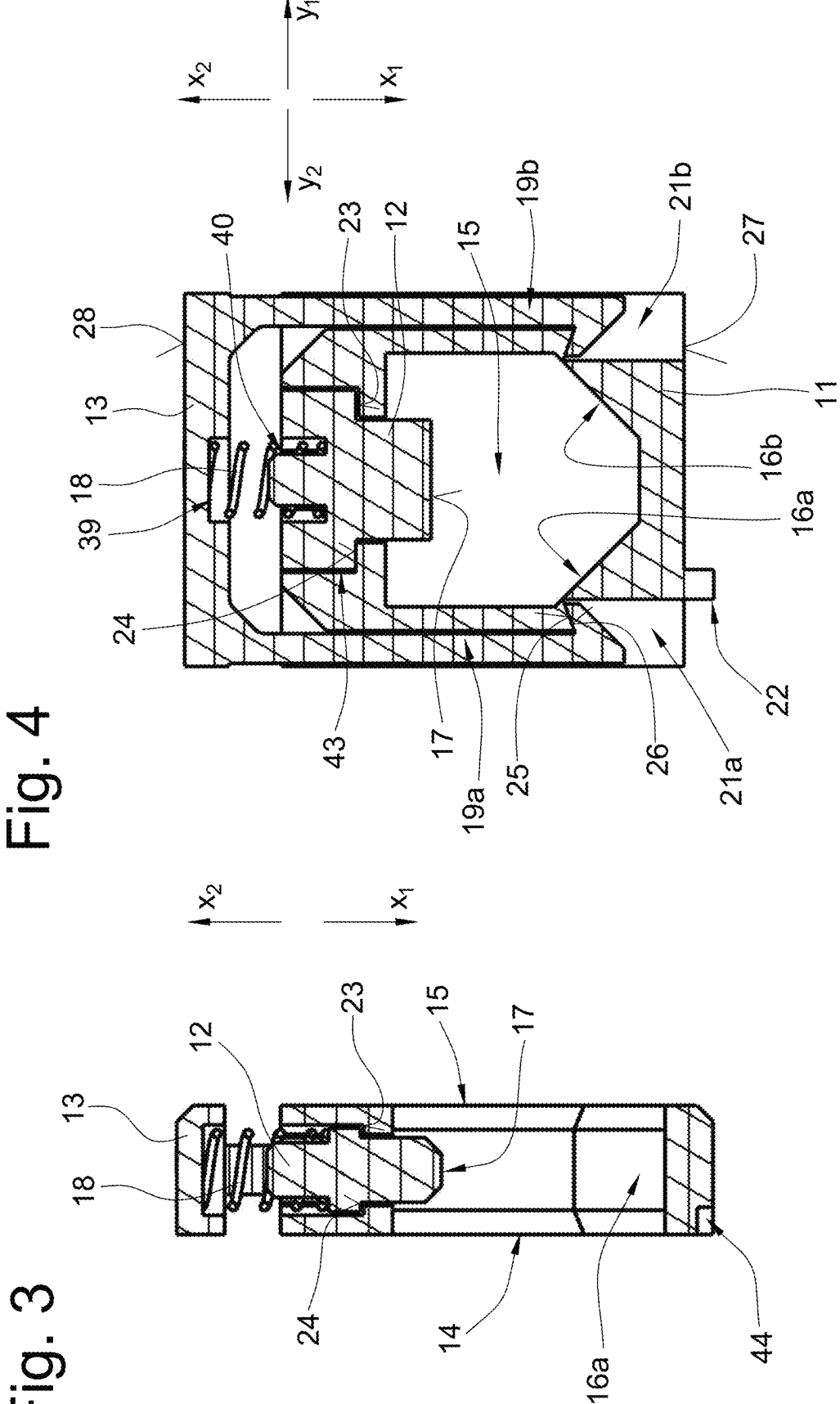
FIG. 3 shows a cross-sectional view along section line A-A in FIG. 1.
FIG. 4 shows a cross-sectional view along section line B-B in FIG. 2.

It can be seen from FIG. 3 that the second bearing part 12 has a radial protrusion with a stop surface 23, the surface orthogonal of which points in direction x1. In the present example, the protrusion is formed by an annular protrusion but could alternatively comprise at least one separate protrusion having a stop surface and protruding in direction x1/x2 and/or in direction y1/y2. The stop surface 23 cooperates with a stop edge 24 of the first bearing part 11 to limit a movement of the second bearing part 12 in direction x1. According to FIGS. 3 and 4, the protrusion 23 bears against the stop edge 24 because there is no rod in the opening 15.

In FIG. 4 it can be seen that the arms 19a and 19b of the third bearing part 13 are configured at free end regions with a stopper surface 25, which can move in contact with an abutment surface 26 of the first bearing part 11 in order to limit the movement of the third bearing part 13 in direction x2 relative to the first bearing part 11. According to FIG. 4, the stopper surfaces 25 bear against the abutment surfaces 26 because there is no rod in the opening 15. The third bearing part 13 can be moved in direction x1 relative to the first bearing part 11. In the present example, the abutment surfaces 26 have an undercut, i.e. they are slightly angled, and stopper surfaces 25 are shaped correspondingly to prevent the stopper surfaces 25 from sliding sideways off the abutment surfaces 26.

As is clear from FIGS. 3 and 4, the loading device 18, in this case a spring, is held on the second bearing part 12 and on the third bearing part 13 and loads the second bearing part 12 and the third bearing part 13 away from one another in opposite directions, wherein the second bearing part 12 is loaded in direction x1 and the third bearing part 13 is loaded in direction x2. The loading device 18 is held on the first bearing part 11 in a spring seat 39 and on the second bearing part 12 in a spring seat 40. Alternatively, dedicated loading devices 18, particularly springs, could also be used for loading the second bearing part 12 and for forcing apart the first bearing part 11 in relation to the third bearing part 13.

The spring force is transferred to the first bearing part 11 via the protrusion 23 and the stop edge 24. The first bearing part 11 and the third bearing part 13 are forced apart in this way so that the stopper surface 25 and the abutment surface 26 bear against each other, wherein the bearing unit 10 forms an assembly which can be installed as a single unit.

The first bearing part 11 comprises a first contact surface 27 and the third bearing part 13 comprises a second contact surface 28, which, by reason of the restoring force of the loading device 18, bear without play against mating surfaces of a bearing seat (not shown in FIGS. 1 to 4). The mating surfaces of the bearing seat, which are in contact via the first contact surface 27 and the second contact surface 28, are dimensioned in such a way that the stopper surfaces 25 and the abutment surfaces 26 are spaced apart from each other when the bearing unit 10 is in the bearing seat and the loading device 18 is under tension.

FIG. 5 shows a base part 29, of a head restraint for example, which is provided with guides 33a and 33b having central axes m, which extend in direction z (z1 and z2). The guide 33a comprises bearing seats 31a and 32a and the guide 33b comprises bearing seats 31b and 32b. Each guide 33a and 33b is configured as an opening, through which a rod not shown in FIG. 5 can pass. The bearing seats 31*a* and 32*a* are located at opposite end regions of the guide 33*a* and the bearing seats 31*b* and 32*b* are located at opposite end regions of the guide 33*b*. The base part 29 is provided with a contact surface 34, in this case a head contact surface.

FIG. 6 shows a cross-sectional view of the base 29, wherein bearing units 10 are located in the bearing seats 31*a* and 32*a*. The bearing unit 10 in the bearing seat 31*a* is installed rotated through 180° with respect to the central axis m in relation to the bearing unit 10 in the bearing seat 32*a*. In this way, a loading situation is simulated in which the head of a seat occupant is supported against a contact surface 34. To put it another way, if a force F is exerted on the contact surface 34, the base part 29 does not move relative to the rod (not shown in FIG. 6) because the unmovable bearing structures 16*a* and 16*b* bear against the rod. In other words, a load from the user does not cause the bearing unit 12 to move against the spring force due to loading of the second bearing part 12 such that the user is aware of a play.

Figure 7:
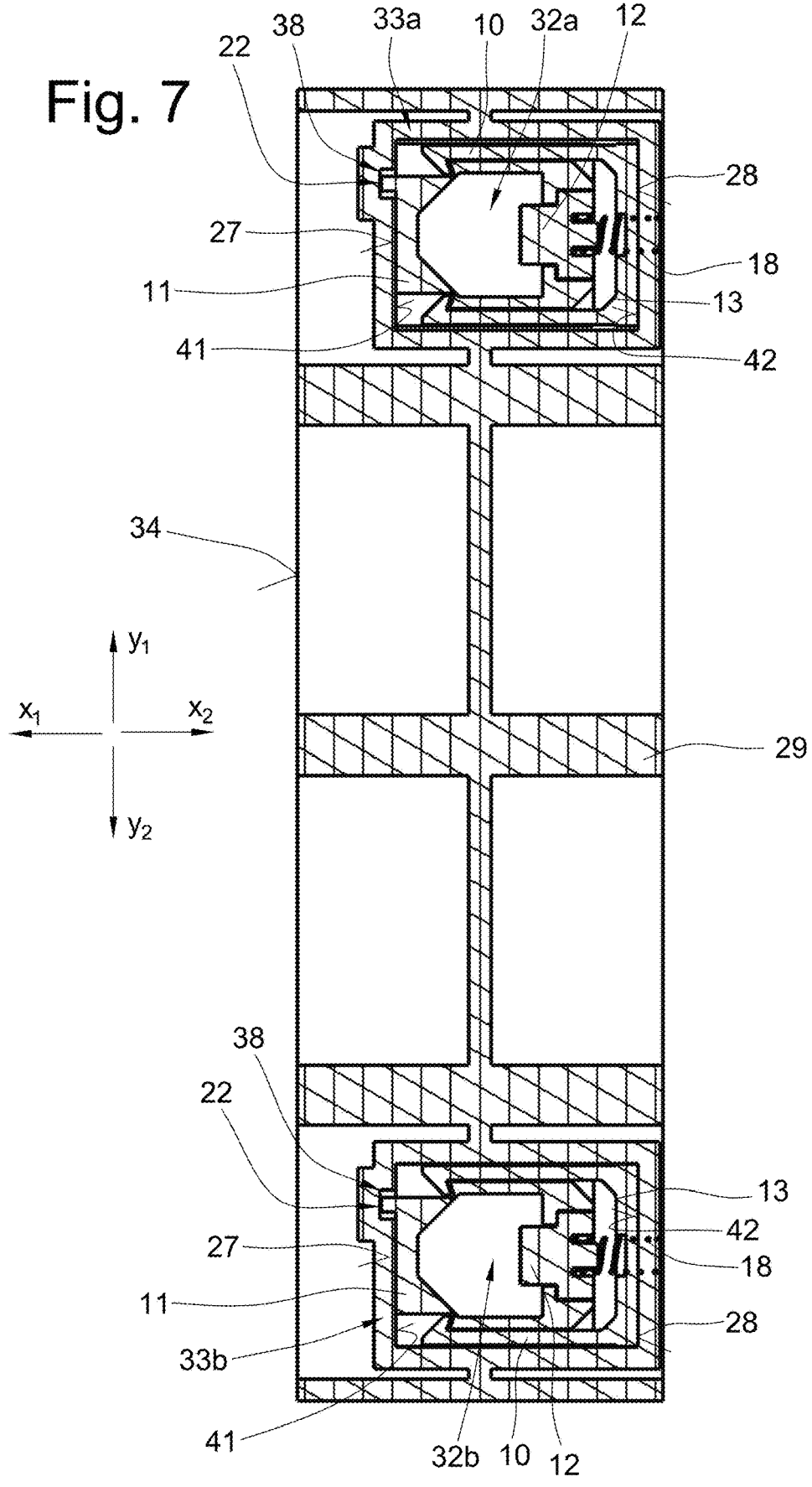
FIG. 7 shows a cross-sectional view along section line C-C in FIG. 5.

It can be seen from FIG. 7 that the first bearing part 11 is supported with the first contact surface 27 on a surface 41 of the bearing seat 31. The second contact surface 28 of the third bearing part 13 is supported on a surface 42 of the bearing seat 31. The loading device 18 pushes the third part 13 and the second part 12 away from one another. The second part 12 is pressed with the stop surface 23 against the stop edge 24, wherein the contact surface 27 presses against the surface 41.

The bearing unit 10 is received in the bearing seat 31*b* in the same way as the bearing unit 10 in the bearing seat 31*a*.

An improper installation of the bearing unit 10 is prevented because the bearing unit 10, in this case the first part 11, has a form-fitting element 22 which is received in an opening 38 only when installed in a specific position and in any other position collides with a wall of the bearing seat 31*a* and 31*b* or 32*a* and 32*b*.

Figure 8:
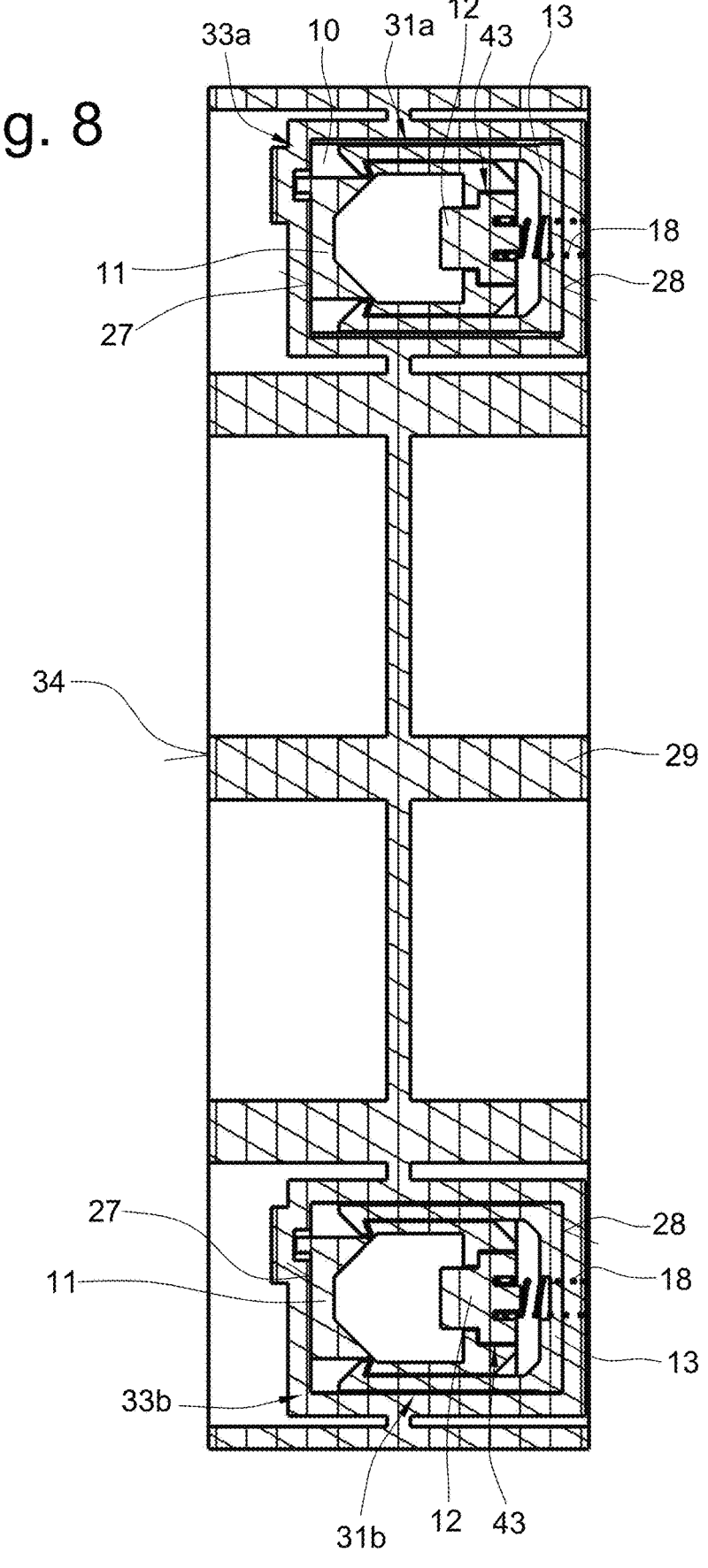
FIG. 8 shows a cross-sectional view along section line E-E in FIG. 5.

FIG. 8 shows the two lower bearing seats 32*a* and 32*b*, which are configured in the same way as the bearing seats 31*a* and 31*b* and in which the respective bearing unit 10 is similarly arranged.

Figure 9:
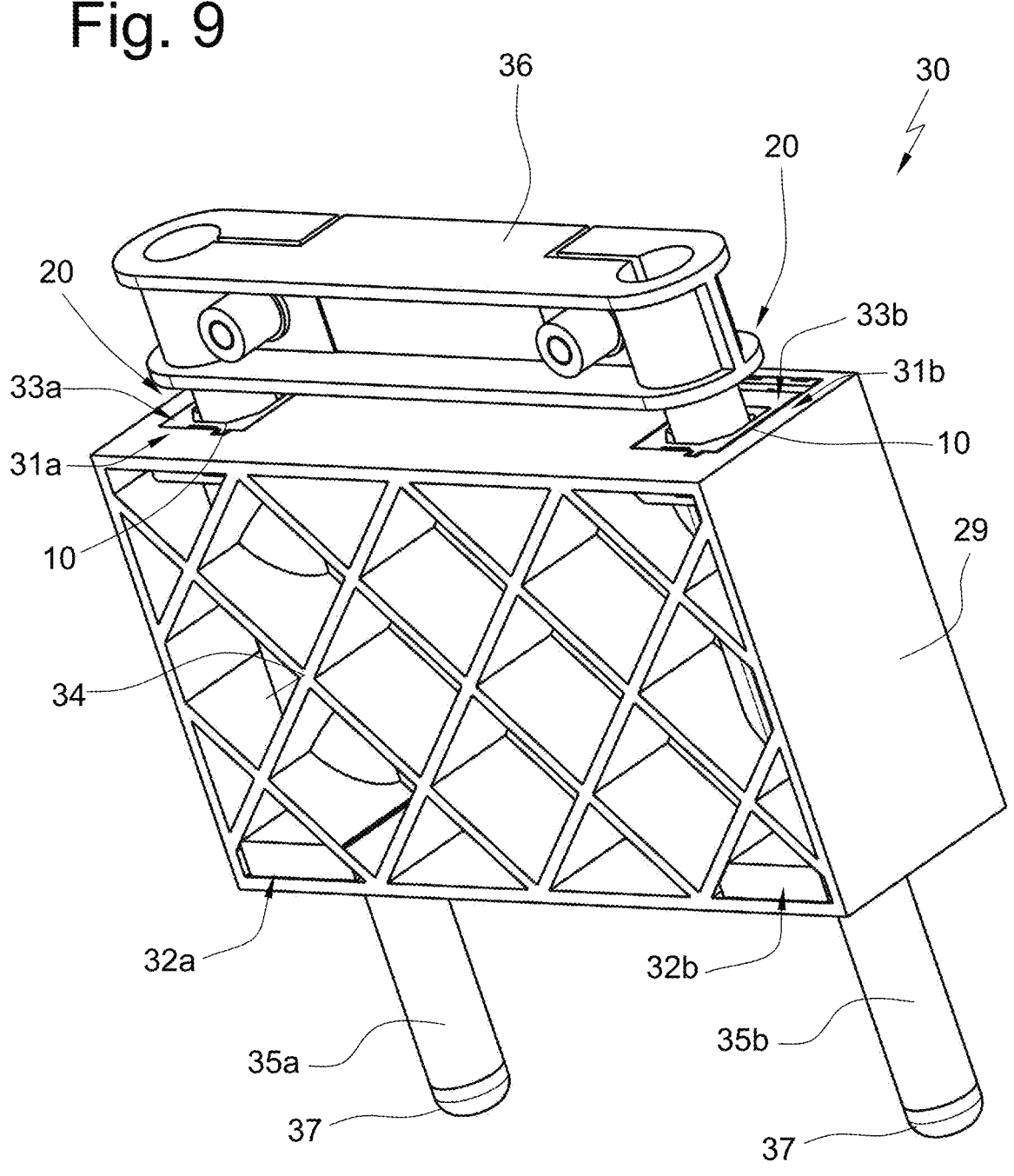
FIG. 9 shows a perspective view of an equipment part, comprising a base part which is guided with two guiding arrangements, wherein each guiding arrangement comprises a rod and two spaced-apart bearing units.

FIG. 9 shows a perspective view of an equipment part 30, in this case a head restraint, which is provided with two bearing arrangements 20 according to the invention, which in this case each comprise two bearing units 10 and a rod 35*a* and 35*b* respectively. The equipment part 30 comprises a base part 29, which forms two guides 33*a* and 33*b* (see also FIG. 10). The guide 33*a* is provided with bearing seats 31*a* and 32*a*, the guide 33*b* with bearing seats 31*b* and 32*b*.

A bearing unit 10 is received in each of these bearing seats 31*a*, 31*b*, 32*a*, 32*b*. The form-fitting element 22 of the bearing unit 10 is received in an opening 38. The guide 33*a* comprises a rod 35*a* and the guide 33*b* comprises a rod 35*b*. Each rod 35*a* and 35*b* respectively passes through the opening 15 in the receiving region 14 of the bearing units 10. The rods 35*a* and 35*b* are interconnected by way of a cross-member 36. The rods are provided at one end region with plugs 37 to avoid injuries and prevent the ingress of dirt.

According to FIG. 11, each bearing seat 31*a*, 31*b*, 32*a*, 32*b* has first retaining means 45, which cooperate with second retaining means 44 of the bearing unit 10 such that the bearing unit 10 can only be removed from the respective bearing seat 31*a*, 31*b*, 32*a*, 32*b* if the dimensions of the bearing unit 10 are changed by moving together the first bearing part 11 and the third bearing part 13 against the force of the loading device 18.

The base part 29 can be mounted on the rods 35 by means of the bearing arrangement 20 so as to be adjustable in direction z1 and z2, for example. A locking device (not shown) can be present, for example, with which the base part 29 can be locked in a specified position relative to the rods 35*a* and 35*b*. The locking device can have detent notches, for example, in at least one of the rods 35*a* and 35*b* and a bolt that is fixed to the base and can be moved between a bolted position in which it can brought into engagement with a detent notch and a released position in which it is disengaged from the notches.

Figures 12, 12A:
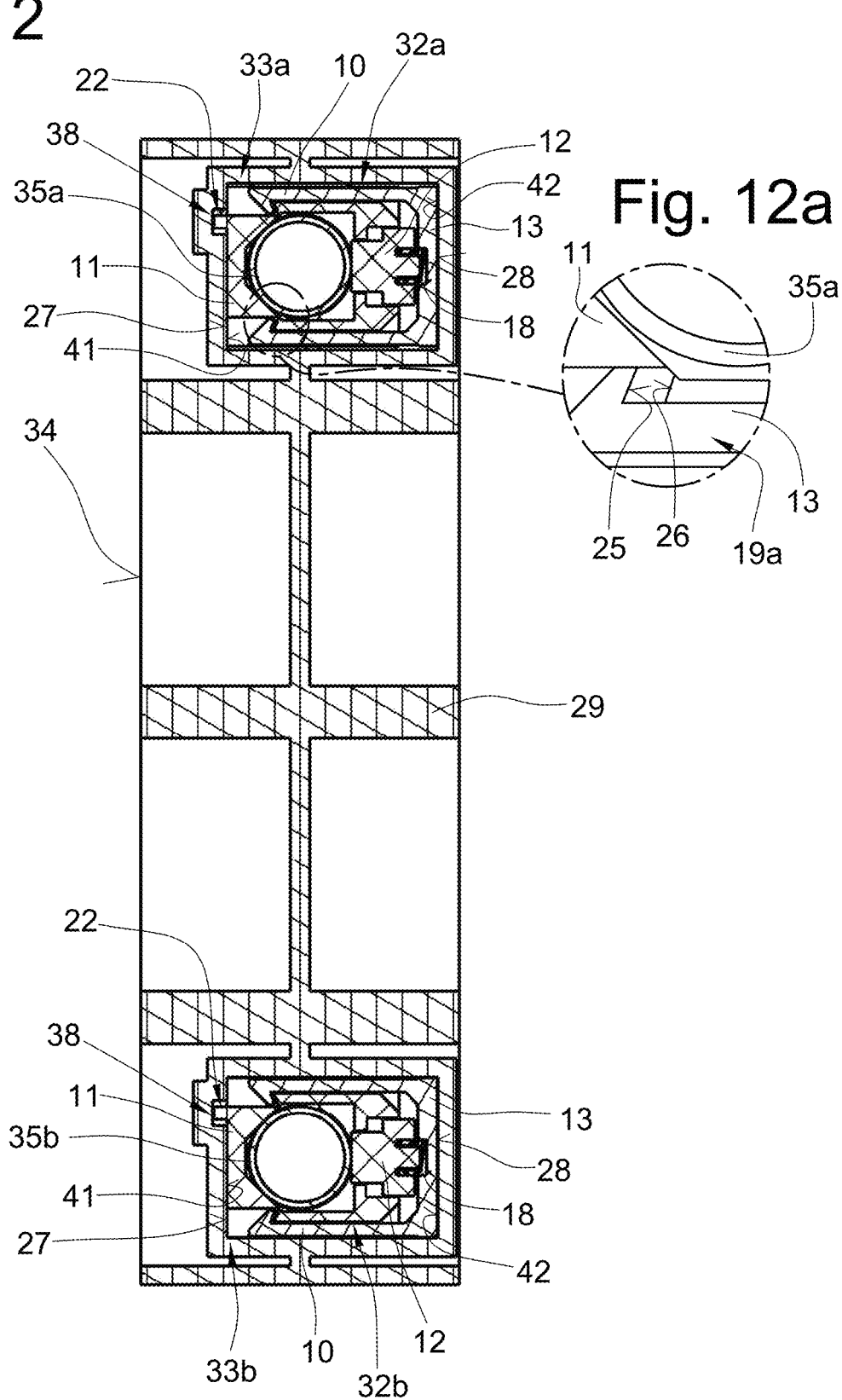
FIG. 12 shows a cross-sectional view along section line F-F in FIG. 10.
Figure 13:
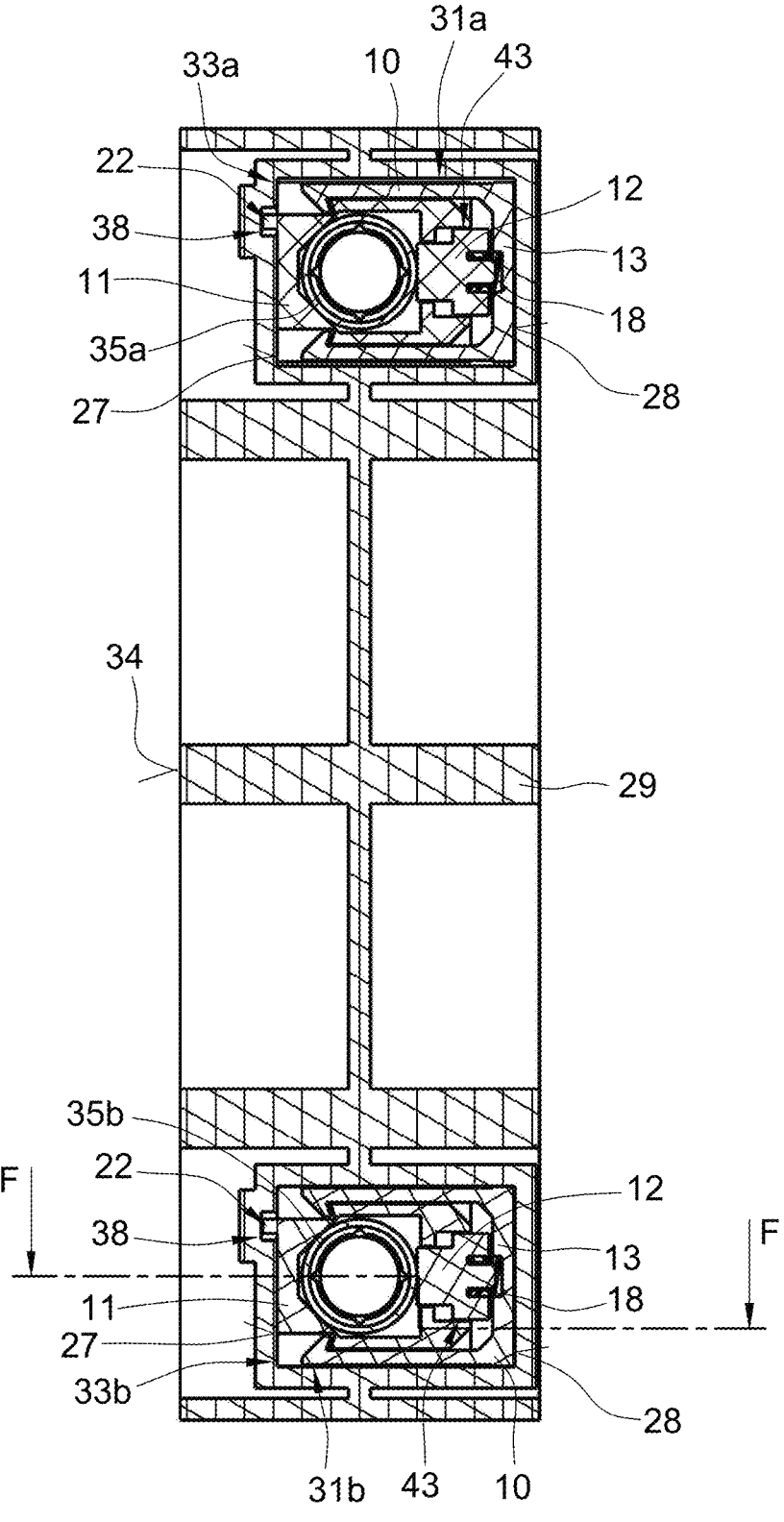
FIG. 13 shows a cross-sectional view along section line H-H in FIG. 10.
Figures 14, 15, 16:
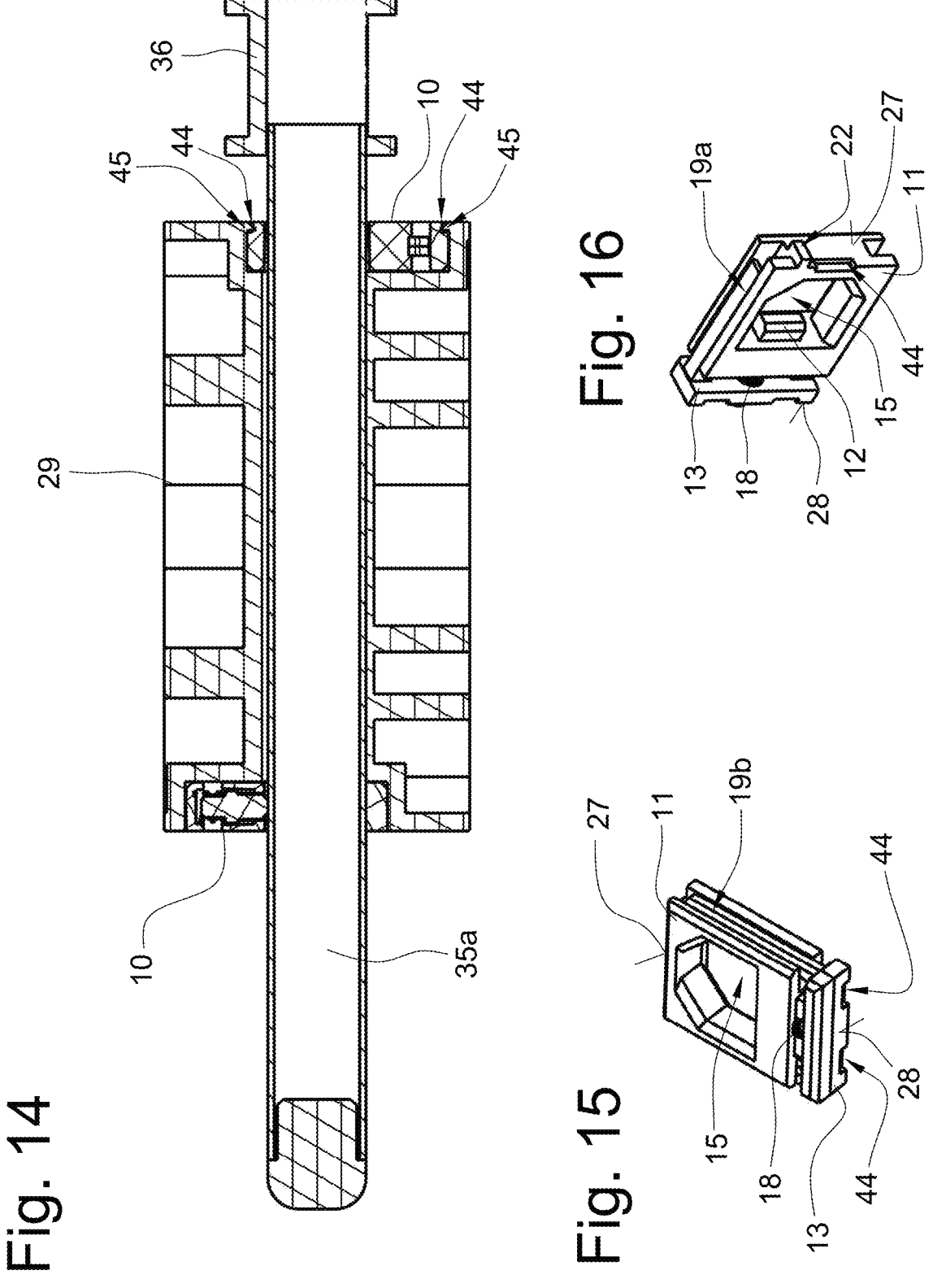
FIG. 14 shows a cross-sectional view along section line F-F in FIG. 13, wherein first retaining means of the base part and second retaining means of the bearing unit can be seen.
FIG. 15 shows a perspective view of the bearing unit from a first perspective.
FIG. 16 shows a perspective view of the bearing unit from a second perspective.

FIG. 12 shows the bearing seats 31*a* and 31*b* and FIG. 13 shows the bearing seats 32*a* and 32*b*, each of which contains a bearing unit 10. For example, in the bearing unit 31*a* it is clear that the rod 35*a* passes through the opening 15. The second bearing part 12, loaded by the loading device 18, presses the rod 35 against the bearing structures 16*a* and 16*b* of the first part 11. The rod 35*a* thus bears against all the bearing structures 16*a*, 16*b* and 17. In this case, the first bearing part 11 is pressed with its contact surface 27 against the surface 41 of the bearing seat 31*a*. Moreover, the loading device 18 loads the contact surface 28 of the third bearing part 13 against the surface 42 of the bearing seat 31*a*.

It is clear from FIGS. 12 and 12*a* that there is a space both between the stop surface 23 and the stop edge 24 and between the stopper surface 25 and the abutment surface 26. It can also be seen that the second bearing part 12 is forced by the rod 35*a* in direction x2 to such an extent that it is not possible for the first bearing part 11 and the third bearing part 13 to be pushed together, and thus the bearing unit 10 cannot accidentally come out of the bearing seat 31*a*. The same also applies to the bearing seats 31*b*, 32*a* and 32*b*.

The invention claimed is:

1. A bearing unit, comprising: a receiving region with an opening; a rod arrangeable in the opening so as to be relatively movable; at least one first bearing structure and a second bearing structure that are configured to be in contact with the rod when the rod is located in the receiving region; at least one first bearing part having the first bearing structure and a primary contact surface for cooperating with a first mating surface of a bearing seat; a second bearing part having the second bearing structure, wherein at least one region of the first bearing part or of the second bearing part is loaded by a loading device in a first direction so that the rod is loaded by the second bearing structure against the first bearing structure; and a third bearing part having a secondary contact surface that cooperates with a second mating surface of the bearing seat, the third bearing part being arranged so as to be movable relative to the first bearing part, wherein the loading device or a dedicated loading device loads the third bearing part in a second direction that is opposite the first direction.

2. The bearing unit according to claim 1, wherein the bearing unit forms a frame that has bearing means for receiving the bearing unit in a bearing seat.

3. The bearing unit according to claim 1, wherein the third bearing part and the first bearing part are movably guided on one another.

4. The bearing unit according to claim 1, wherein the second bearing part is movably guided in a guide of the first bearing part.

5. The bearing unit according to claim 1, wherein the third bearing part has an abutment surface that cooperates with a stopper surface of the first bearing part to limit the relative movement.

6. The bearing unit according to claim 1, wherein the second bearing part has a stop surface that is loaded by the loading device against a stop edge of the first bearing part.

7. The bearing unit according to claim 1, wherein the loading device comprises at least one spring.

8. The bearing unit according to claim 1, wherein the bearing unit extends substantially in a first spatial direction and a second spatial direction and has a limited extent in respect of a third spatial direction.

9. A guiding arrangement, comprising at least one bearing unit according to claim 8; and at least one rod.

10. The guiding arrangement according to claim 9, wherein a central rod axis extends in a region of a support in the third spatial direction.

11. The guiding arrangement according to claim 9, wherein the second bearing part is configured to be located in a movement path of the third bearing part when the rod is in the receiving region so that the bearing unit cannot be removed from the bearing seat.

12. An equipment part of the vehicle interior, comprising: a base part that is movably or immovably mounted on at least one rod portion, wherein the base part comprises at least one guide having at least one bearing seat; and a bearing unit received in each bearing seat; and a rod passes through an opening in the bearing unit so that a guiding arrangement according to claim 9 is formed.

13. The equipment part according to according to claim 12, wherein the base part has at least one bearing seat and the bearing seat has an undercut so that the bearing unit is only mountable in or removable from the bearing seat by changing the length against a force of the loading device.

14. The equipment part according to according to claim 12, wherein the guide comprises at least two bearing seats and a first bearing unit in a first bearing seat is arranged rotated through 180° with respect to a central axis in relation to a second bearing unit in a second bearing seat.

\* \* \* \* \*